US011641450B2

(12) United States Patent
Spattini (10) Patent No.: US 11,641,450 B2
(45) Date of Patent: *May 2, 2023

(54) APPARATUS FOR VIDEO COMMUNICATION

(71) Applicant: HUDDLE ROOM TECHNOLOGY S.R.L., Campogalliano (IT)

(72) Inventor: Stefano Spattini, Campogalliano (IT)

(73) Assignee: HUDDLE ROOM TECHNOLOGY S.R.L., Campogalliano (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,648

(22) Filed: Sep. 7, 2021

(65) Prior Publication Data

US 2021/0409646 A1 Dec. 30, 2021

Related U.S. Application Data

(63) Continuation of application No. 16/223,256, filed on Dec. 18, 2018, now Pat. No. 11,115,626, which is a (Continued)

(51) Int. Cl.
*H04N 7/15* (2006.01)
*H04N 7/14* (2006.01)

(52) U.S. Cl.
CPC ............. *H04N 7/152* (2013.01); *H04N 7/147* (2013.01)

(58) Field of Classification Search
CPC combination set(s) only.
See application file for complete search history.

(56) References Cited

U.S. PATENT DOCUMENTS

| 2003/0020803 A1* | 1/2003 | Yang | ......................... H04N 7/15 348/E7.083 |
| 2005/0231588 A1* | 10/2005 | Yang | ...................... H04N 7/152 375/E7.199 |

(Continued)

FOREIGN PATENT DOCUMENTS

EP 2587799 A1 5/2013

OTHER PUBLICATIONS

Notification of Reexamination issued in the CN Application No. 20160062830.4, dated Mar. 29, 2022.

*Primary Examiner* — Phung-Hoang J Nguyen (57) ABSTRACT

An apparatus for video communication configured to be locally connected to a local processing device executing a video conferencing software for communicating with a remote location, the apparatus being further configured to be locally wirelessly connected to a plurality of local mobile devices each comprising a display and a video camera. The apparatus comprises: receiving means configured to receive a plurality of video signals related to a plurality of participants in a video conference generated by the video cameras of the plurality of local mobile devices, generating means operatively connected to said receiving means and configured to generate an output video communication stream based on said plurality of video signals received from the plurality of local mobile devices, and transmitting means configured to transmit the output video communication stream to said local processing device executing the video conferencing software. The apparatus is configured to receive from the local processing device an output signal representing a content displayed by a display of the processing device when executing the video conferencing software; the apparatus comprises sharing means configured to share with the plurality of local mobile devices the output (Continued)

signal representing a content displayed by the display of the processing device.

9 Claims, 3 Drawing Sheets

Related U.S. Application Data continuation of application No. 15/534,043, filed as application No. PCT/EP2016/060525 on May 11, 2016, now Pat. No. 10,194,118.

(56) References Cited

U.S. PATENT DOCUMENTS

| | | | |
|---|---|---|---|
| 2010/0131862 A1* | 5/2010 | Douani | G06T 11/60 |
| | | | 715/753 |
| 2010/0225736 A1* | 9/2010 | King | H04N 7/152 |
| | | | 348/14.09 |
| 2012/0050456 A1 | 3/2012 | Arnao et al. | |
| 2013/0142452 A1 | 6/2013 | Shionozaki et al. | |
| 2013/0216206 A1 | 8/2013 | Dubin et al. | |
| 2014/0098174 A1 | 4/2014 | Summers | |
| 2014/0164629 A1* | 6/2014 | Barth | H04B 11/00 |
| | | | 709/227 |
| 2014/0365506 A1 | 12/2014 | Gong et al. | |
| 2015/0208031 A1 | 7/2015 | Lievens et al. | |
| 2015/0310260 A1 | 10/2015 | Summers | |
| 2016/0134785 A1* | 5/2016 | Greene | G06V 40/168 |
| | | | 348/500 |
| 2017/0048286 A1* | 2/2017 | Ichihashi | H04L 65/611 |

* cited by examiner

APPARATUS FOR VIDEO COMMUNICATION

CROSS REFERENCE TO RELATED APPLICATIONS

This application is a continuation of U.S. patent application Ser. No. 16/223,256, filed on Dec. 18, 2018, now U.S. Pat. No. 11,115,626, issued on Sep. 7, 2021, which is a continuation of U.S. patent application Ser. No. 15/534,043, filed Jun. 8, 2017, now U.S. Pat. No. 10,194,118, issued on Jan. 29, 2019, which is the U.S. National Stage Entry of International Patent Application Serial No. PCT/EP2016/060525, filed on May 11, 2016, which claims priority to IT Patent Application No 102015000048123, filed on Sep. 2, 2015, the entire disclosure of which are incorporated by reference herein.

TECHNICAL FIELD OF THE INVENTION

The present invention relates to an apparatus for video communication, particularly for video conferences.

BACKGROUND OF THE INVENTION

So-called "endpoint" or "room" or "group" apparatuses dedicated to video conferences with multiple participants present simultaneously in meeting rooms and the like are known. Generally, the known apparatuses are provided with a camera, one or more screens, microphones and loudspeakers and are installed by specialized operators inside the rooms they must serve. However, such known apparatuses are generally very costly and have little flexibility, since they are not easily and rapidly adaptable to the different needs of users.

A known alternative to this type of apparatuses is the use of systems of the "desktop" type, made up of a PC, a monitor, loudspeakers, a webcam, a microphone and, naturally, software for video conferences.

This type of apparatuses is very economical and quite effective if a user wants to take part in a video conference, for example, from their desk, but does not effectively meet the needs of a video conference in a room with multiple participants.

In fact, in the case of use in a meeting room, the PC is generally connected to a television set placed at one end of the meeting room, and on which the webcam is mounted. The microphone is commonly connected to the PC and placed on top of a table in the meeting room.

Due to the limited framing angle of a webcam, which in general is 90° at most, it is easy to understand that the aforesaid solution largely undermines the effectiveness of the video conference, since the majority of people taking part in it are either not clearly visible due to the excessive distance or are even not captured by the webcam and, as a consequence, it is possible only to hear their voice.

In order to remedy this limitation, sometimes the conference participants move closer to one another, getting into uncomfortable positions, and above all considerably reducing the effectiveness of communication in the video conference session.

The patent application US 2013/0307919 A1 refers to video conferencing equipment. This document describes a multiple camera (multi-camera) device having a plurality of input ports, each configured to receive video information when connected to a respective external video camera, and an output port capable of outputting video information. The multi-camera device includes also a selection component configured to provide video information from at least one of the plurality of input ports to the output port for output to an external computer. The selection component may produce composite video information from video information received from multiple input ports. Whatever video conferencing software may be installed on the external computer (e.g., Skype, WebEx, or AdobeConnect, etc.). Audio/video information from multiple cameras, either as video from a single camera that changes as the speaker changes or as composite video information displaying multiple participants, may be transmitted to a remote location via one or more networks to which the external computer is connected. Despite representing an improvement with respect to other known techniques, the system described in US 2013/0307919 A1 is still not satisfactory, because the plural participants to the conference in a room cannot always properly follow the interventions of the participants in the remote location, due to the fact that the participants in the remote location are only displayed on the screen of the external device running the video conferencing software. In particular, when the screen of the external device running the video conferencing software is small and there is a large number of participants attending the conference, following the interventions of the participants in the remote location is difficult and inconvenient. The technique of US 2013/0307919 A1 is applicable to the case of an impromptu video conference, i.e. a video conference carried out in the absence of an installed dedicated video conference equipment (such as a large TV set or screen). In such cases of impromptu video conference, the solution of the prior art is particularly dissatisfactory, because it is difficult to properly follow the intervention of the participants at the remote location as above mentioned. As a further drawback of the prior art, the gaze of a local participant is normally directed towards the screen of the laptop for watching the remote participants, and not towards the respective video camera capturing the image of the local participant; as a consequence, the remote participants do not have the impression that the local participants are looking towards them during the conference; in other words, no eye-to-eye contact can be established between the local participants and the remote participants. This renders the conference even less effective.

SUMMARY OF THE INVENTION

The main task of the present invention is to devise an apparatus for video communication that serves to improve the effectiveness of communication in a video conference session by effectively managing the framing of the participants present in the room.

Another object of the present invention is to devise an apparatus for video communication which enables the various participants to remain comfortably seated in their places inside the room throughout the entire video conference session.

A further object of the present invention is to devise an apparatus for video communication which makes it possible to overcome the above-mentioned limitations of the prior art within the scope of a simple, rational solution that is easy and effective to use and has a modest cost.

A further object of the present invention is to provide an apparatus and a system for video communication which permit the local participants to properly follow the interventions of the participants at the remote location, also in case of impromptu video conference.

A further object of the present invention is to provide an apparatus and a system for video communication which permit to establish an eye-to-eye contact between the local participants and the remote participants during the video conference.

The objects set forth above are achieved by an apparatus for video communication configured to be locally connected to a local processing device executing a video conferencing software for communicating with a remote location, the apparatus being further configured to be locally wirelessly connected to a plurality of local mobile devices each comprising a display and a video camera, the apparatus comprising:
   receiving means configured to receive a plurality of video signals related to a plurality of participants in a video conference generated by the video cameras of the plurality of local mobile devices,
   generating means operatively connected to said receiving means and configured to generate an output video communication stream based on said plurality of video signals received from the plurality of local mobile devices, and
   transmitting means configured to transmit the output video communication stream to said local processing device executing the video conferencing software,
wherein the apparatus is configured to receive from the local processing device an output signal representing a content displayable by a display of the processing device when executing the video conferencing software, wherein the apparatus comprises sharing means configured to share with the plurality of local mobile devices the output signal representing the content displayable by the display of the processing device.

In this aspect, the apparatus shares (i.e., transmits) the content displayable by a display of the processing device executing the video conferencing software (i.e. a content including or constituting the video images received at the processing device from the remote location by means of the video conferencing software) to all mobile devices involved in the conference. This function can be achieved by mirroring the display of the processing device executing the video conferencing software at the displays of all mobile devices involved in the conference. Thus, all participants to the conference in the room can properly follow the interventions of the participants in the remote location by means of their respective mobile devices, also in case of impromptu video conference and in the absence of a large TV set or screen in the room. Furthermore, an eye-to-eye contact between the local participants and the remote participants can be achieved during the video conference, because the participants look at their own mobile devices during the conference and the mobile devices capture the images of the participants.

According to a further aspect, the apparatus is wirelessly connected with the local mobile devices via an IEEE 802.11 interface for receiving the video signals generated by the video cameras of the plurality of local mobile devices and for sharing the output signal representing the content displayable by the display of the processing device.

According to a further aspect, the apparatus is wirelessly connected with the local processing device executing the video conferencing software via an IEEE 802.11 interface for transmitting the output video communication signal to the local processing device and for receiving the output signal representing the content displayable by the display of the processing device. According to a further aspect, the apparatus is further configured to receive from the local processing device a video signal generated by a video camera associated to the local processing device, the generating means being configured to generate said output video communication stream also based on the video signal received from the local processing device. In this aspect, the available resources are used efficiently, by involving also the local processing device executing the conferencing software in the generation of the single output video communication stream.

According to a further aspect, the generating means are configured to combine said plurality of video signals received from said plurality of local mobile devices into a single video communication stream representing a video including a patchwork of moving images captured by different local mobile devices.

The present invention further provides a system for video communication comprising: an apparatus as above mentioned, a local processing device executing a video conferencing software for communicating with a remote location, and a plurality of local mobile devices each comprising a display and a video camera,
   the apparatus being locally connected to the local processing device executing the video conferencing software, and being locally wirelessly connected to the plurality of local mobile devices.

According to a further aspect, each of local mobile devices is anyone among a notebook, a laptop, a mobile phone and a tablet. In this aspect, all participants in the room can properly follow the conference by using their own mobile devices.

According to a further aspect, the local processing device executing a video conferencing software is anyone among a notebook, a laptop, a personal computer, a mobile phone and a tablet.

According to a further aspect, the local processing device, when executing the video conferencing software, is configured to exchange video conferencing signals including the output video communication stream with the remote location via internet, wherein the local processing device, when executing the video conferencing software, is configured to access the internet via the apparatus. According to this aspect, when carrying out the video conference, the local processing device can use only one single wireless connection (such as a WiFi connection) to the apparatus both for communicating with the remote location and for exchanging signals locally with the mobile devices of the participants in the room. This allows using devices having capability for establishing only one wireless connection, as the host device for running the video conferencing software.

According to a further aspect, the invention provides an apparatus for video communication, able to produce at output a video communication stream, comprising processing means and operatively associable with image acquisition means able to produce at least a video signal related to a plurality of participants in a video conference, comprising:
   recognition means to recognize at least a speaker among said participants in the video conference, starting from said at least one video signal, and generating means of said video communication stream operatively connected to said processing means and to said recognition means and able to generate said video communication stream starting from said at least one video signal and depending on the signal at output from said recognition means.

According to a further aspect, the apparatus is configured for receiving a framing command from one of mobile devices or from the processing device, the framing command being inputted by a user of the mobile device or of the processing device, wherein the generating means are configured to change a mode of generating the output video communication stream depending on a recognition of a speaker based on the received framing command. This allows to safely identify the speaking person during the video conference.

DETAILED DESCRIPTION OF THE PREFERRED EMBODIMENTS

Other features and advantages of the present invention will become more apparent from the description of a preferred but not exclusive embodiment of an apparatus for video communication, illustrated by way of a representative, non-limiting example in the appended drawings, in which.

Within the framework of the present description, reference will be made to an "apparatus for video communication", particularly for video conferences; this should not be construed as limiting, since the apparatus 1 can also be used in other forms of video communication.

The apparatus 1 has been conceived to be placed on a surface 2, such as, for example, a table in a meeting room. Alternatively, the apparatus 1 might also be installed in a disguised manner in a room.

As can be seen from the figures, according to a preferred embodiment the apparatus 1 has a substantially cylindrical outer body 3. However, different shapes and sizes of the body 3 are not ruled out.

Figure 1:
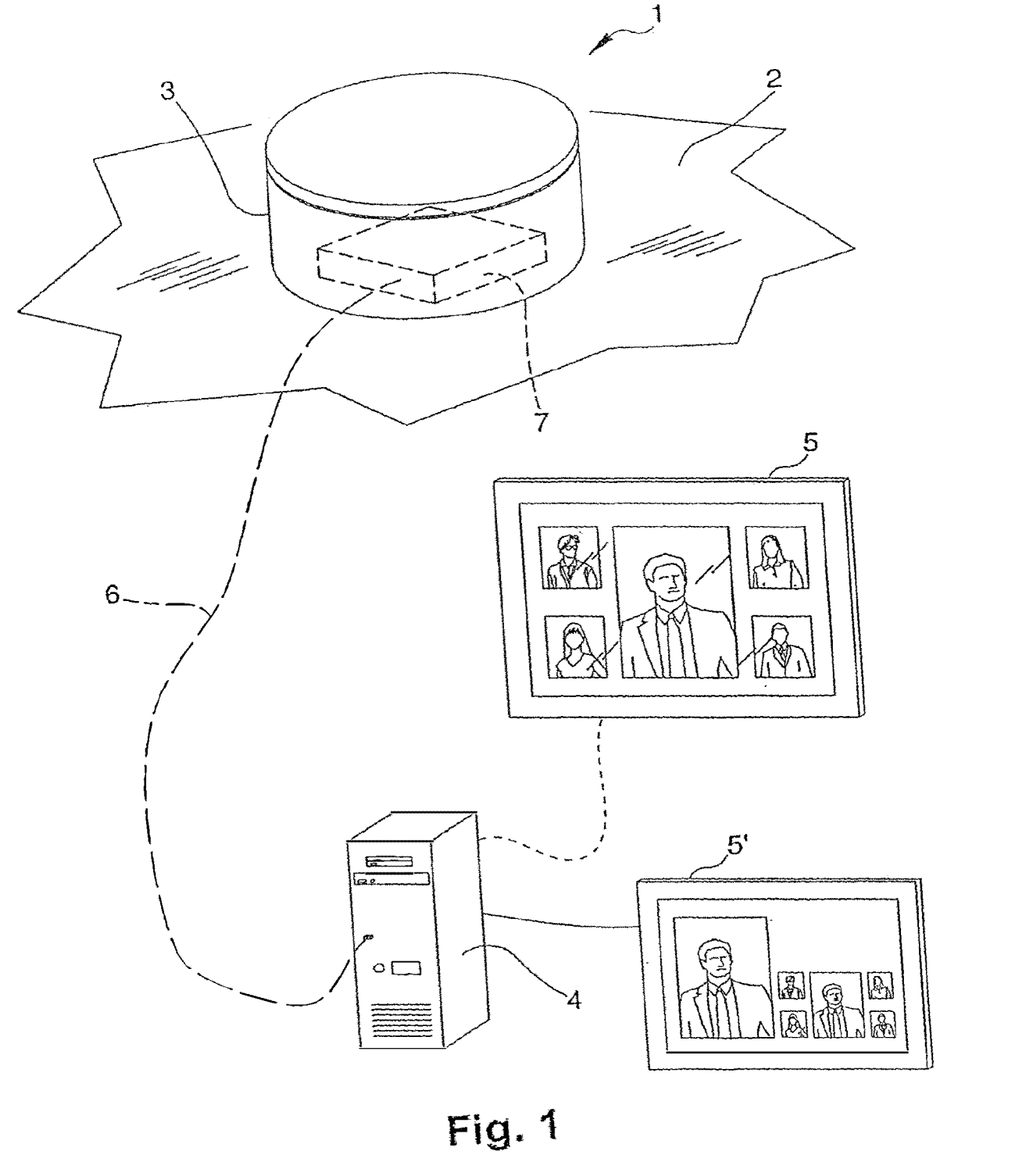
FIG. 1 is a schematic view of the apparatus according to the invention applied to a generic video conference system.

The apparatus 1 can be connected to a personal computer 4 of a conventional type, such as a desktop computer, a laptop computer or any other computer of a known type, provided with video conferencing software of a conventional type (such as Skype or the like).

Advantageously, the apparatus 1 is able to produce as output a video communication stream 6 suitable for being sent to the personal computer 4 and, subsequently, by the video conferencing software on the personal computer itself, for example over the conventional Internet network, towards a remote screen 5 used by one or more remote participants taking part in the video conference session.

Optionally, the personal computer 4 is further connected to a screen 5' present inside the room, such as a television set or a monitor, which can be used to display the images received from remote participants.

Alternatively, the apparatus 1 might be connected to the screen 5', for example via HDMI cable, so that the apparatus 1 may provide the video conferencing signal received from the remote location to the screen 5' for displaying thereof (not shown in the figures); in this manner, the personal computer 4 might not need any cable connections for the purpose of the video conference, if connected to the apparatus 1 via a wireless interface. According to the invention, the apparatus 1 comprises processing means 7 and is operatively connectable to image acquisition means 11 adapted to produce at least a video signal 9 related to the participants in the video conference.

Advantageously, the image acquisition means 11 connectable to the apparatus 1 can be multiple and of different types.

For example, the image acquisition means 11 can comprise:

at least a camera 11 such as a webcam or the like;
at least a camera 11 of at least one mobile device 10, such as, for example, a smartphone or a tablet;
at least a camera 11 of at least one portable personal computer, such as a laptop or the like.

Therefore, the apparatus 1 supports the simultaneous use of a plurality of cameras 11, also of different types and built into different devices.

One or more webcams 11 can for example be associated with the body 3 of the apparatus 1 or, alternatively, they can be rested upon or in some way fixed to the table in the room in which the video conference is being held. If the cameras 11 of one or more mobile devices 10 are used, each mobile device 10 is equipped with management and control means 14, preferably consisting of specific software for managing and sending the images picked up by the mobile device itself. Usefully, the management and control means 14 can be provided with functions for controlling the sending of the captured image.

For example, the control functions can enable the captured images to be managed, for example functions of momentarily stopping the transmission of the images and/or functions for selecting the cameras to be used among those built into the mobile device 10 (for example, the front and/or back camera).

Preferably, the image acquisition means 11 comprises a plurality of cameras 11 configured to capture images of the different participants in the video conference. However, it is not ruled out that images of the different participants can be captured with a single camera 11.

Advantageously, according to the invention, the apparatus I comprises recognition means 13 to recognize at least one speaker among all the participants in the video conference.

In detail, the recognition means 13 comprises at least a suitable software module for processing the video images of the participants in the video conference in order to identify the speaker.

In particular, the recognition means 13 can comprise at least a software module for detecting the lip movements made by the speaker.

Different implementations of the recognition means 13 are not ruled out, however.

For example, the recognition means 13 can comprise at least a software module for detecting a gesture of the participants in front of the camera. This gesture can be, for example, the raising of a hand by one of the participants. In this manner, therefore, during the video conference it will always be possible for each of the participants to have themselves framed (i.e. become the speakers) by making a certain gesture in front of the camera. Alternatively, the apparatus 1 is configured for receiving a framing command from one of mobile devices 10 or from the processing device 4, whereby the framing command is inputted to the mobile device or to the processing device by its user by means of a software interface installed on the respective device.

In this case, the generating means 17 can be configured to change a mode of generating the output video communication stream depending on a recognition of a speaker based on the received framing command. Thus, the recognition means 13 may recognize the speaker based on the framing command; this allows to safely identify the speaking person during the video conference. Preferably, only one among the mobile devices 10 and the processing device 4 is entitled to send the framing command to the apparatus 1; in this manner, a single local user might properly control the generation of the output video communication stream to be transmitted to the remote location.

The recognition means 13 are operatively connected to processing means 7. Advantageously, the apparatus 1 further comprises generating means 17 for generating the video communication stream 6, operatively connected to processing means 7 and recognition means 13 and adapted to generate the video communication stream 6 starting from the video signals 9 acquired by means of the cameras 11 and depending on the signal output from said recognition means 13, i.e. depending on the speaker detected.

In particular, the generating means 17 can comprise a mixing module adapted to compose the video streams originating from the image acquisition means 11.

In other words, the m1xmg module is adapted to perform a so-called "mixing", i.e. to integrate the plurality of the video signals 9 originating from the individual cameras 11 into a single video stream.

In detail, the integration, i.e. the composition of the video streams into a single video stream, takes place depending on the criteria and specific needs of a user.

In particular, the apparatus 1 captures the video images from all the devices connected to it, crops the images around the face of the participant and is capable of identifying which one of them is actually speaking.

Once it has collected the video images, the apparatus 1, by means of the mixing module, is capable of composing the video communication stream 6 toward the personal computer 4. Depending on the specific layout selected by the user, the video communication stream 6 can comprise:

- displaying exclusively the video signal 9 relating only to the speaking participant identified;
- the mixing of the video signals 9 of all participants with the speaker highlighted (the composition of the video image can be achieved in different ways);
- the mixing of the video signals 9 relating to all participants with equal emphasis (all the video images are conveyed in the same video communication stream without any difference between speakers and non-speakers).

The selection might occur also during the conference by means of a software interface installed on the personal computer 4.

For example, with reference to mixing with the speaker highlighted, the video image of the speaker can take on a specific positioning inside the screen 5 and, moreover, has larger dimensions than the video images relating to the other participants in the video conference.

This makes it possible not to exclude the other participants in the video conference, but rather to modulate the dimensions and positioning of the respective videos within the screen 5 (and optionally within the preview on the screen 5' inside the room) depending on how the video conference proceeds.

In other words, when there is a switch from one speaker to another, the video images of the person who has just started speaking take on a larger size and occupy the main position inside the screen 5 compared to those relating to the previous speaker, which take on a secondary position. However, different configurations with different formats can be adopted as regards both the resolution and disposition of each video image inside the screen 5.

It should be noted, moreover, that from the point of view of implementation, the selection of the particular mixing method can be made by the user of the personal computer 4 which manages the video conference, by appropriately selecting a specific video driver of the apparatus 1 from among the following specific types of layout:

- driver 1: speaker only;
- driver 2: mixing with speaker highlighted;
- driver 3: mixing with equal emphasis on all participants.

Usefully, if for any reason the apparatus 1 is not capable of determining with certainty which of the participants is the speaker, the apparatus 1 will automatically select the mixing mode with equal emphasis on all participants.

Advantageously, the processing means 7 comprises one or more processing units, and are adapted to produce as output the video communication stream 6.

It is worth pointing out that, within the scope of the present discussion, "video communication stream" means the signal which preferably comprises both a video signal 9 and an audio signal 12. Preferably, the video communication stream 6 is processed by the generating means 17 inside the apparatus 1 and can be transmitted via a physical output such as a USB port, an antenna, or the like to the personal computer 4 and, therefore, to the management software of the video conference.

However, different embodiments in which the generating means 17 are implemented in a device separate from the apparatus 1, for example on a personal computer 4, are not ruled out.

The management system of the apparatus 1 comprises management and control means 14 operatively connected to processing means 7 and suitable for the management and control of the video signal 9 acquired by camera 11 of each mobile device 10.

Advantageously, the management and control means 14 comprises at least a software program installable on each mobile device 10. In particular, the software program is adapted to manage the communication with the processing means 7 of the apparatus 1.

Advantageously, the apparatus 1 comprises sharing means 18 for sharing the desktop of the personal computer 4 connected in the video conference. In particular, the sharing means 18 is operatively connected to the management and control means 14 of each mobile device 10, for the sharing, on the mobile devices, of an output signal 15 originating from the personal computer 4 and relating to the desktop of the personal computer 4 adapted to manage the video conference.

The use of the sharing means 18 is to be considered particularly advantageous in the event that in the meeting room there is no screen 5, such as, for example, a TV or a large monitor, on which all the participants can see the remote participants and the shared documents.

In particular, according to a possible embodiment, the apparatus 1 comprises a video input (for example, of the HDMI, DVI or VGA type) and the personal computer 4, on which the program used for the video conference (for example Skype) is being run, is connected via a video output (HDMI/DVI/VGA) to said video input. Therefore, the output signal 15 originating directly from the video output of the personal computer 4 is transmitted to the video input of the apparatus 1 and, from there, is transmitted via the sharing means 18 to each of the mobile devices 10.

In practical terms, therefore, users participating in the video conference with a mobile device 10 will send (if they want) their image and audio captured by the mobile device 10 to the apparatus 1 and can receive and display on the mobile device the desktop of the personal computer 4 and, therefore, the video image of the remotely connected participants, as well as any documents shared in the video conference session.

With reference to a possible alternative embodiment, the personal computer 4 on which the program used for the video conference is being run (for example Skype) is connected via USB, Ethernet or Wi-Fi to the apparatus 1. In such a case, on the personal computer 4 there is an acquisition module 19 operatively connected to the sharing means 18 on the apparatus 1 and adapted to perform a screen-capture of the desktop of the personal computer 4. For example, the acquisition module 19 can consist of specific client software installable in the personal computer 4.

The video images thus captured are then encapsulated in a stream format that is sent from the personal computer 4 to the apparatus 1, and from the latter to all the connected mobile devices 10. In practical terms, users who participate m the video conference with a mobile device 10 can send their image and the audio captured by the mobile device 10 to the apparatus 1 and can receive and view on the mobile device itself the image of the desktop of the connected personal computer 4, and thus the video of the remotely connected participants and any documents shared in the video conference session.

Finally, the apparatus 1 comprises sound acquisition means 16 for acquiring the voice signal of the speaker.

Advantageously, the sound acquisition means 16 can comprise:
- at least a microphone 16, which may be positioned, for example, on the table in the meeting room;
- at least a microphone 16 connected to one of the mobile devices 10; at least a microphone 16 built into the mobile devices 10;
- at least a microphone 16 built into a webcam 11;
- at least a microphone 16 built into the apparatus 1.

In particular, the apparatus 1 enables the use of the microphone 16 built into a mobile device 10. This makes it possible to avoid the use of one or more microphones specifically dedicated to the video conference, as well as enabling an optimal sound acquisition for each of the participants. Usefully, moreover, the apparatus 1 can have at least one USB port for the connection and recharging of the mobile devices 10 used by the users sitting at the table.

Finally, the configuration of the apparatus 1 (possible indication of the local network connected to, settings, activation of sources, limitations imposed, preferences and other parameters) can be carried out by means of a specific software application installable in a personal computer 4 or a mobile device 10.

In conclusion, it is specified that the video communication system, meant as the combination of hardware and software capable of completely managing a video conference, comprises the above-described apparatus 1, the above-described image acquisition means 11, operatively connected to the apparatus 1 and adapted to produce at least a video signal 9 related to a plurality of participants in a video conference, and the personal computer 4 operatively connected to the apparatus 1 and provided with video conferencing software.

Figure 2:
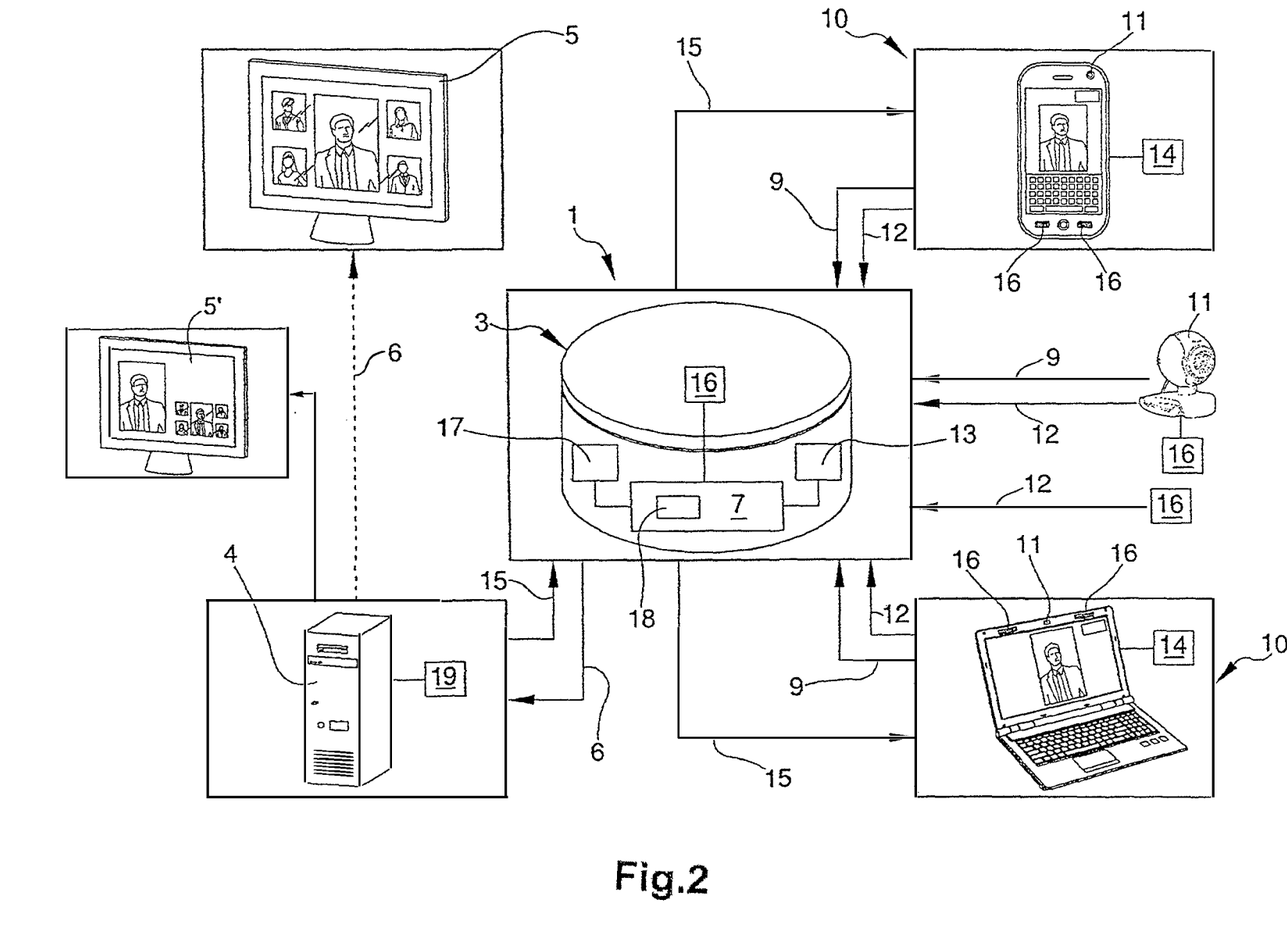
FIG. 2 is a schematic representation of the operation of the apparatus according to the invention.

The operation of the present invention is as follows.

During a video conference, the detection module 13 processes the video images acquired from the cameras 11 and detects the lip movements (or other possible predefined movements and gestures) of the speaker.

The speaker's voice is picked up by a microphone 11 built into a portable device 10 or, alternatively, by a special dedicated microphone 11 placed so as to rest on a surface 2 in proximity to the speaker.

The output audio signal 12 and video signal 9 are directed to the generating means 17, which in turn integrate them so as to generate the video communication stream 6 output from the apparatus 1.

In particular, the video communication stream 6 is generated according to the specific mode of mixing the video signals 9 selected by the user. The video communication stream 6 is then directed to the screen 5 of one or more remote participants which, for example, can display the speaker in the foreground and the other participants in the video conference in the background.

Optionally, via the sharing means 18, operatively connected to management and control means 14 of each mobile device 10, it is possible to share, on the mobile devices, one or more video signals 15 originating from the video conferencing software on the personal computer 4 and relating to one or more remote participants in the video conference.

Figure 3:
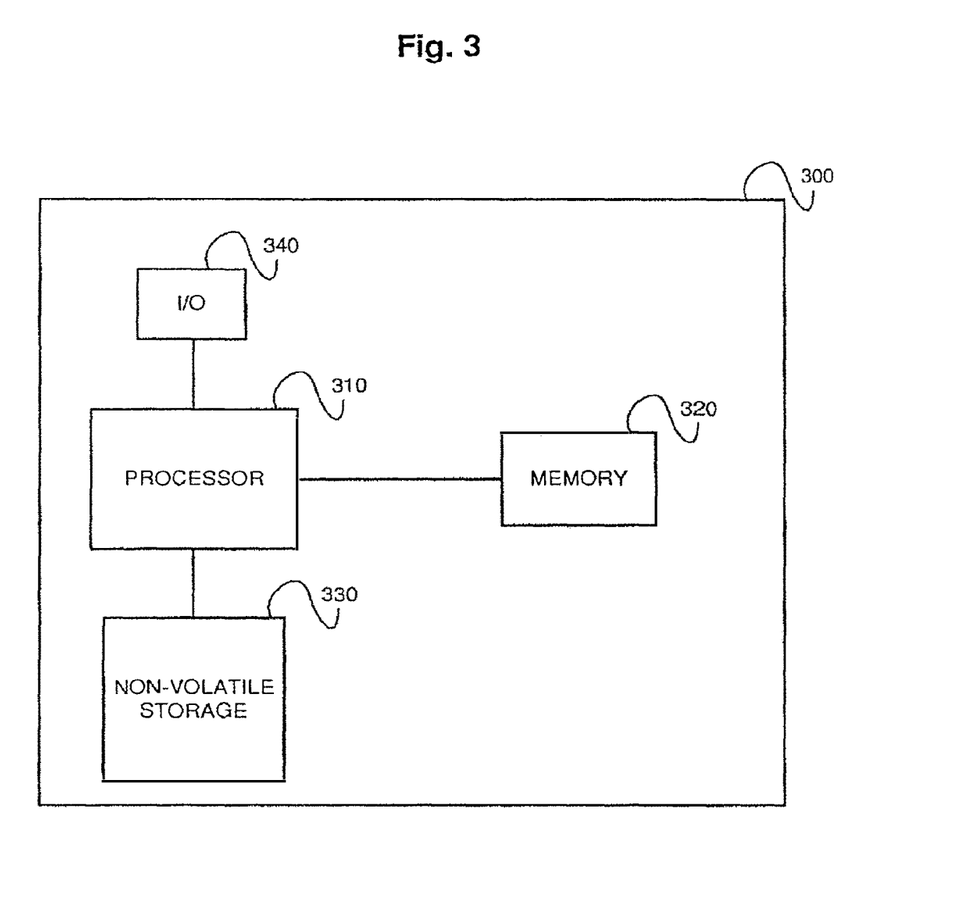
FIG. 3 shows an illustrative implementation of apparatuses used according to the invention. With particular reference to the figures, 1 denotes in its entirety an apparatus for video communication.

FIG. 3 shows an illustrative implementation of a computer system 300 that may be used to implement one or more of the above described devices, for example to implement the above described apparatus 1. The computer system 300 may include one or more processors 310 and one or more non-transitory computer-readable storage media (e.g., memory 320 and/or one or more non-volatile storage media 330). The processor 310 may control writing data to and reading data from the memory 320 and/or the nonvolatile storage device 330 in any suitable known manner. Processor 310, for example, may form the processing means 7, the generating means 17 and the recognition means 13 provided as part of the apparatus 1; the processor 310 may perform the functionality above described for the processing means 7, the generating means 17 and the recognition means 13. To perform the functionality above described of the apparatus 1, the processor 310 may execute instructions stored in one or more computer-readable storage media (e.g., the memory 320, storage media, etc.), which may serve as non-transitory computer-readable storage media storing instructions for execution by processor 310. The computer system 300 includes an input/output functionality 340 to receive data and to provide data, and may include a control apparatus to perform I/O functionality. In particular, the computer system 300, when implementing the apparatus 1, includes one or more antennas for receiving/transmitting video signals from/to the mobile devices 10 and the local processing device 4. The function of the above described sharing means 18 may be performed by the I/O 340 under the control of the processor 310.

According to an embodiment, the generating means 17 and the recognition means 13 may be part of the processing means 7 of the apparatus 1. According to an embodiment, the function of the generating means 17 may be performed by the processing means 7 of the apparatus 1 and the generating means 17 may be absent. According to an embodiment, the function of the recognition means 13 may be performed by the processing means 7 of the apparatus 1 and the recognition means 13 may be absent.

According to an embodiment, the above described personal computer 4 can be replaced by a mobile phone, a tablet or a laptop executing the video conferencing software (such as Skype, etc.).

It has been ascertained in practice that the described invention achieves the set objectives.

In particular, it should be emphasized that the apparatus for video communication according to the invention serves to improve the effectiveness of communication in a video conference session through the real-time identification of each individual speaker and an effective management of the framing of the participants present in the room.

Furthermore, the apparatus according to the invention enables the use of the cameras and microphones of mobile devices, thus ensuring that the video images and sounds of the participants can be effectively picked up without any additional cost.

This also permits the various participants to remain comfortably seated in their places inside the room throughout the entire video conference session.

The invention claimed is:

1. A local video conferencing device for video communication, the local video conferencing device comprising:
 a processor that when executing instructions stored in a memory configure the processor to:
  receive, from a plurality of local devices having cameras, video signals associated with a plurality of local participants in a video conference;
  receive a framing command from a local device, of the plurality of local devices, in response to an input from a participant associated with the local device;
  identify the participant as a speaker based on the framing command;
  identify a gesture associated with a participant of the plurality of participants;
  automatically mix the plurality of video signals into a single output video communication stream having a layout based on parameters input into the local video conferencing device by a user; and
  transmit the single output video communication stream to the plurality a local devices and to remote devices associated with remote participants of the video conference for display;
  wherein the layout displays the speaker in a highlighted manner and other participants of the plurality of participants in a non-highlighted manner.

2. The local video conferencing device according to claim 1, wherein the local device is configured for connection to a screen via an HDMI cable.

3. The local video conferencing device according to claim 1, wherein the layout is one of:
 a layout displaying the speaker only; and
 a layout displaying all participants with equal emphasis.

4. The local video conferencing device according to claim 1, wherein the single video stream represents a patchwork of moving images captured by the plurality of local mobile devices.

5. The local video conferencing device according to claim 1, wherein the processor is further configured to:
 execute video conferencing software.

6. The local video conferencing device according to claim 1, wherein the processor is further configured to:
 connect to each of the plurality of local devices; and
 share an output signal of the local video conferencing with the plurality of local devices.

7. A method for executing a video conference, the method comprising:
 receiving, by a local video conferencing device, video signals associated with a plurality of local participants in a video conference from a plurality of local devices having cameras;
 receiving, by the local video conferencing device, a framing command from a local device, of the plurality of local device, in response to an input from a participant associated with the local device;
 identifying, by the local video conferencing device, the participant as a speaker based on the framing command;
 identifying, by the local video conferencing device, a gesture associated with a participant of the plurality of participants;
 automatically mixing, by the local video conferencing device, the plurality of video signals into a single output video communication stream having a layout based on parameters input into the local video conferencing device by a user; and
 transmitting, by the local video conferencing device, the single output video communication stream to the plurality a local devices and to remote devices associated with remote participants of the video conference for display;
 wherein the layout displays the speaker in a highlighted manner and other participants of the plurality of participants in a non-highlighted manner.

8. The method according to claim 7, wherein the plurality of local video conferencing processing is one of a personal computer, a notebook, a laptop, a mobile phone, and a tablet.

9. The method according to claim 7, wherein the single video stream represents a patchwork of moving images captured by the plurality of local mobile devices.

* * * * *